Jan. 14, 1930.  A. PINEAU  1,744,010
INSTRUMENT PANEL
Filed March 14, 1928
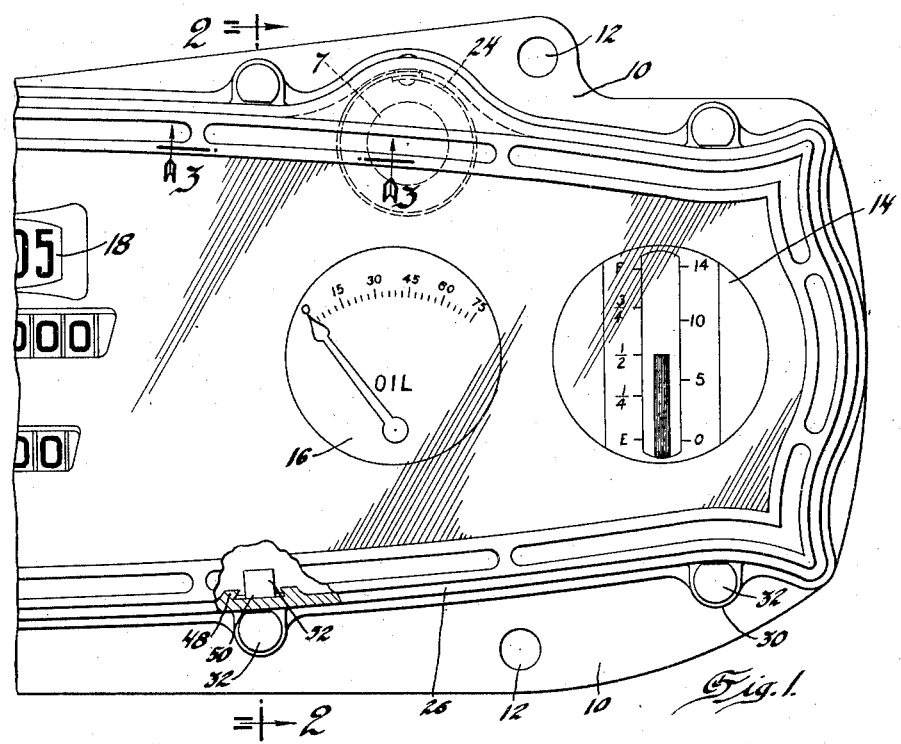
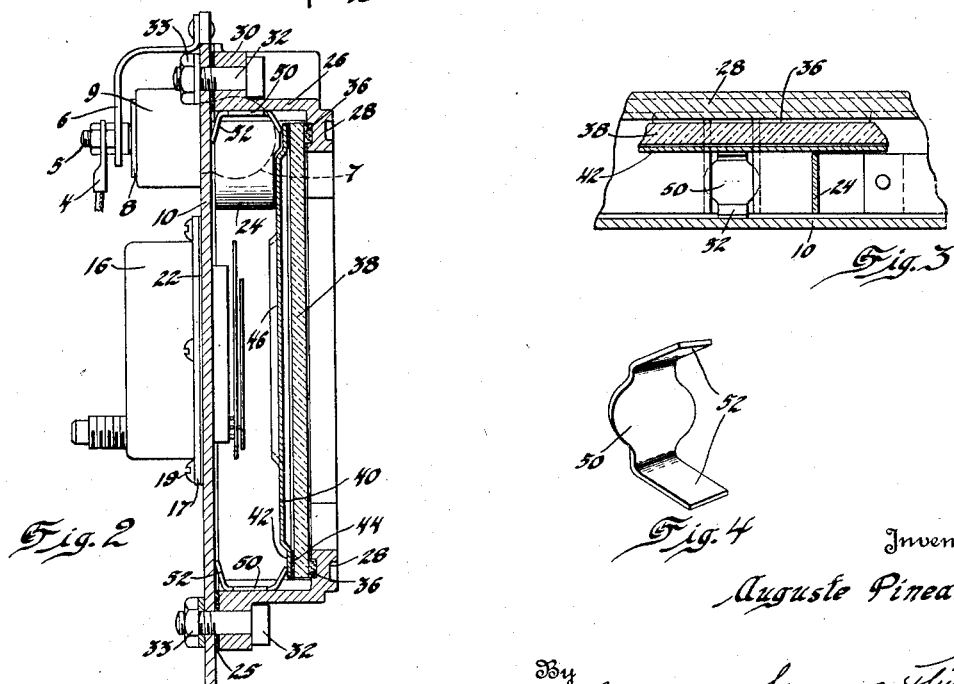
Inventor
Auguste Pineau
By Blackmore, Spencer & Flinh
Attorneys Patented Jan. 14, 1930

1,744,010

UNITED STATES PATENT OFFICE

AUGUSTE PINEAU, OF FLINT, MICHIGAN, ASSIGNOR TO A C SPARK PLUG COMPANY, OF FLINT, MICHIGAN, A COMPANY OF MICHIGAN

INSTRUMENT PANEL

Application filed March 14, 1928. Serial No. 261,529.

This invention relates to an instrument panel and particularly to an instrument panel of the type usually provided on the instrument board of an automotive vehicle.

One conventional form of instrument panel comprises a casing carrying an instrument or instruments, and provided with a glass coverplate fixed in the casing and covering the faces of the instruments. In order to render the casing dustproof it is essential that the glass be firmly held sealed over the opening. The present invention relates particularly to improvements in instrument panels of this type.

Usually the glass is rigidly clamped between parts of the casing, but this is unsatisfactory because it may place parts of the glass under to much or too little tension. The parts of the casing may be bolted together or otherwise connected and separate means provided for fixing the glass cover in the casing, but this involves the use of a number of small screws, tabs, clips, etc. and adds unnecessarily to the number of parts required.

According to the present invention, I provide an instrument panel of improved construction in which the glass cover is resiliently held within the casing by a pressure sufficient to seal the cover within the casing but never sufficient to break the glass, the usual bolts or screws connecting the two parts of the casing being adapted to hold all the parts of the panel together. Upon removal of the connecting bolts or screws and separation of the two parts of the casing the glass cover may readily be removed.

The means for holding the glass sealed in the casing comprises a number of resilient separate spacers arranged about the inner wall of the casing and compressed between the glass and the rear portion of the casing. The casing is preferably formed with grooves which hold the spacers against displacement and thus facilitate assembly of the parts.

My invention results in the elimination of a number of parts hitherto considered necessary, and consequently permits a reduction in the number of operations required in making and assembling the panel. The panel is simpler in construction than many hitherto used, and less fine and accurate work is required.

Other objects and advantages of the invention will appear in the course of the following description, taken in connection with the accompanying drawing and appended claims.

In the drawing:

Figure 1 is a forward looking elevation of a part of an instrument panel partly broken away to show my invention.

Figure 2 is a section on the line 2—2 of Figure 1.

Figure 3 is a section on the line 3—3 of Figure 1.

Figure 4 is an enlarged perspective view of one of the resilient spacers.

Referring to the drawing, I have illustrated a portion of an elongated instrument mounting plate 10, which may be formed of a flat metal sheet, as provided adjacent its edge with a number of spaced holes 12 for the reception of bolts for fastening the mounting plate to a suitable support, such as the instrument board of an automotive vehicle. The plate is formed with a number of apertures for the accommodation of indicating instruments. In the portion of the mounting plate illustrated I have indicated a fuel gauge 14, oil gauge 16 and speedometer 18.

Each instrument case may be formed with an annular flange 17, and may be fixed to the supporting plate 10 by screws 19 extending through the joint between the flange 17 into the plate, the flange and plate shown as provided with a sealing gasket 22. The mechanism of each instrument may extend in advance of the plate 10 if desired. While the lighting element may be mounted in any suitable manner, I have illustrated a sleeve 9 in which is supported the base 8 of a light bulb 7 which is extended into the panel in advance of the plate 10. The sleeve 9 is resiliently and removably held against the concealed or inner side of the plate 10 by means of a swingable spring bracket 6 extending from the plate 10, and this may hold the head of a terminal bolt 5 pressed against the central contact of the base 8, the terminal of an insulated wire 4 being connected to the terminal bolt 5 in a usual manner. The bulb 7 is preferably surrounded by a strip 24 of pyralin or similar light diffusing material.

Fitting against the visible side of the mounting plate 10, and sealed by a gasket 25, is a frame 26, which is shown as slightly smaller in outline than the plate 10. At spaced points about its periphery the frame 26 may be formed with apertured lugs 30 for the reception of retaining means such as bolts 32 extending through holes in the plate 10, and provided with nuts 33. The plate 10 and frame 26 form an assembly casing which is open on its exposed or outer side, the frame being formed with an inwardly extending flange 28 surrounding the opening. The frame and its flange may be made ornamental in appearance if desired.

The inner side of flange 28 is shown as formed with a groove extending completely about the frame, and frictionally held in this groove is shown a gasket 36 of suitable material, such as cork. Within the frame, opposite the plate 10 and abutting against the gasket 36, is shown a glass cover 38.

On the inner side of any glass 38 there may be provided an ornamental face or opaque cover plate 40. This is spaced slightly from the adjacent surface of the glass 38, and it may be provided about its periphery with an offset flange 42 spaced from the glass 38 by a gasket 44. The plate 40 may correspond in outline with the glass 38 and generally with the inner periphery of frame 26; and it is shown as provided with a bevelled aperture 46 over each instrument face.

The frame 26 may be formed around the inside and at spaced points with a number of dovetail grooves 48, each of which is adapted to receive part of a wide central web or portion 50 of a U-shaped spacer; and each spacer may be provided on each end with a spring finger 52 extending at an angle to the main portion of the spacer. As shown, one finger presses against the plate 10 while the other finger abuts against the flange 42 of the facing plate 40. The spacers may be spring metal stampings, their length before assembling in the panel being a little greater than the distance between plate 10 and flange 42 in the assembled panel. When the plate 10 is fixed to the frame 26, the spacers are compressed somewhat, so that a suitable pressure is applied by each spacer to hold the opaque or other cover plate 40 firmly against the glass 38, and the glass against the sealing gasket 36 and/or flange 28.

The instrument panel described is of simple construction. The frame 26 may be made of any suitable material and by any preferred method, but I prefer to form the frame by die-casting. In assembling, the frame may be laid face-down and the gaskets and cover plates arranged about and opposite the openings therein in the order illustrated. The spacers may then be inserted in their respective grooves, these serving, if provided, to obviate need of other means to hold the spacers securely against displacement. The supporting plate 10 may then be bolted to the frame, this operation serving to fix all the parts together and to seal the panel. Upon removal of the plate 10, the spacers, being separate, may be readily slipped out of their respective grooves and the cover plates removed.

I claim:

1. In an instrument assembly, a casing comprising an instrument supporting portion and side walls, and formed with an opening on its exposed side, an opaque cover within said casing over said opening, and a resilient element supported on the inner side of one of the side walls and resiliently holding said cover in position.

2. In an instrument assembly, a casing comprising an instrument supporting portion and a side wall, and formed with an opening on its exposed side, a cover within said casing over said opening, separate resilient elements supported opposite the inner side of the side wall and pressing against said cover, and sealing means between said cover and casing.

3. In an instrument assembly, a casing comprising an instrument supporting portion and a frame, formed with an opening on its exposed side, a cover within said casing over said opening, and a plurality of resilient elements supported by and spaced about said frame and holding said cover against said casing.

4. In an instrument assembly, a casing having an instrument fixed thereto and provided with an opening for the display of the instrument, and interior grooves about said opening, a cover within said casing over said opening, and resilient elements supported in said grooves and urging said cover against said casing.

5. In an instrument assembly, a casing having an instrument fixed thereto and provided with an opening on its exposed side for the display of the instrument, a cover within said casing over said opening, a plurality of resilient elements dovetailed in the side of said casing and holding said cover in position, and sealing means between said cover and casing.

6. The combination of an instrument supporting casing comprising an inner portion and a frame and formed with an opening on its outer side for the display of the instruments, a glass cover within said casing over said opening, and a resilient spacing element held against displacement by the frame and compressed between said cover and a portion of the casing.

7. The combination of an instrument supporting casing comprising an inner portion and a side wall and formed with an opening on its outer side, a glass cover within said casing and extending over said opening, a plurality of resilient spacing elements held against displacement by the side wall and compressed and slidable between said cover and the rear portion of said casing, and sealing means between said cover and casing.

8. In an instrument assembly, a casing having an opening on its exposed side and an inwardly turned flange about said opening, the inner side of the casing comprising a removable instrument support, a cover for said opening within said casing, and a resilient spacer removably dovetailed in the inner side of said casing and held compressed between said cover and instrument support.

9. The combination with an instrument supporting casing comprising an inner portion and a side wall and formed with an opening on its exposed side for the display of the instruments, said casing comprising interconnectible elements, of a cover within said casing and opposite said opening, and a plurality of leaf springs held compressed between said cover and one of the elements of the casing.

10. An instrument panel comprising a ring-shaped frame formed with a flange on its exposed side and with a plurality of grooves spaced about its inner periphery, a cover within said frame and resting against the frame, a resilient spacing element slidable in each groove, and an instrument support fixed to the inner side of the frame and forcing said spacing element resiliently toward said cover.

11. In an instrument assembly, a casing comprising an inner portion and a side wall and provided with an opening on its exposed side, a glass cover within said casing over said opening, and a spacing element comprising a web held by the side wall and a spring finger urging said cover into position.

12. A resilient spacer for an instrument panel comprising a spring metal clip formed with a wide central portion and with a spring finger at each end extending at an angle to the central portion.

In testimony whereof I affix my signature.

AUGUSTE PINEAU.